July 5, 1938.　　　　G. B. BENTZ　　　　2,122,832
CLOSET BOWL STEP ATTACHMENT
Filed Nov. 9, 1937　　　　2 Sheets-Sheet 1
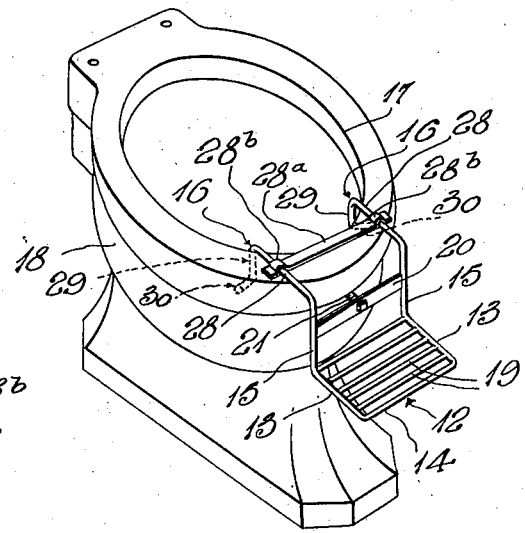
Fig. 1.
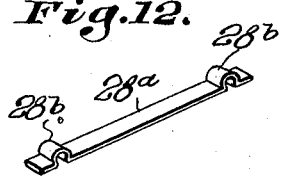
Fig. 12.
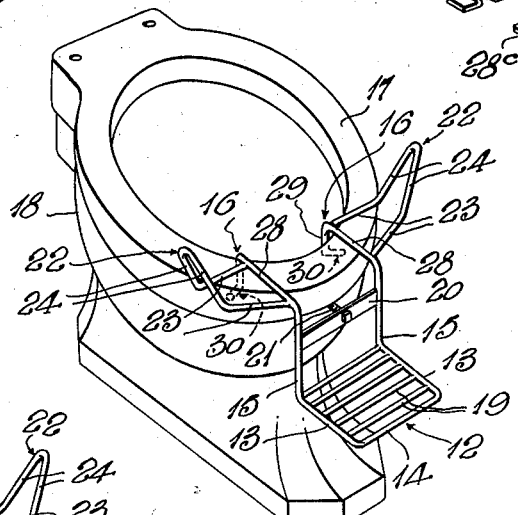
Fig. 2.
Fig. 13.
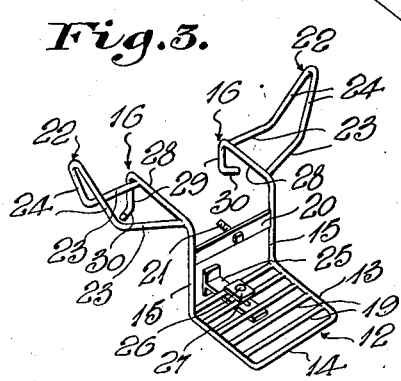
Fig. 3.
Inventor
George B. Bentz
By H. B. Willson &Co
Attorneys

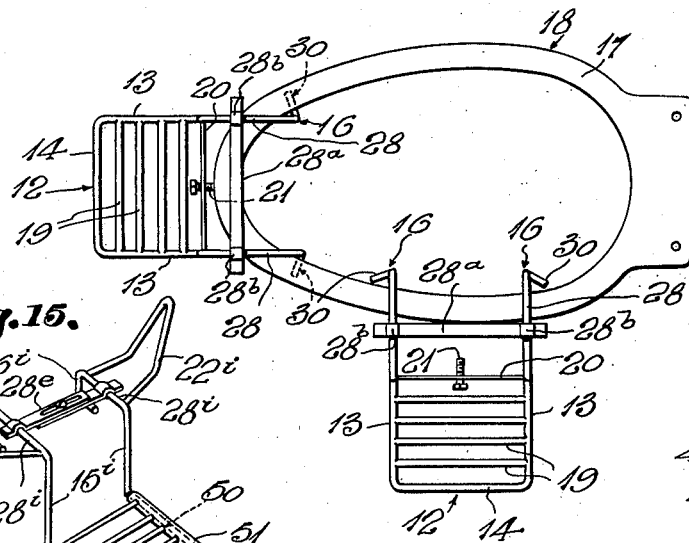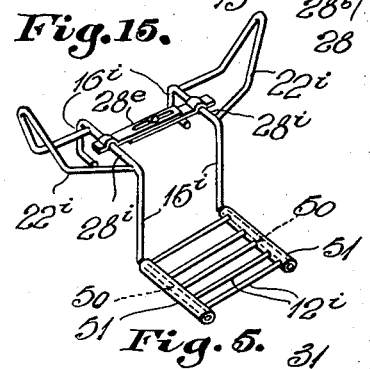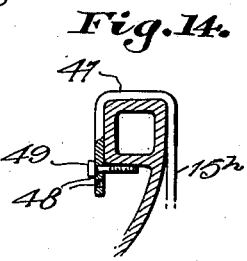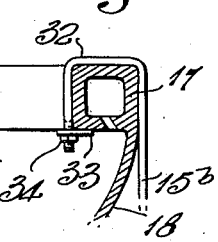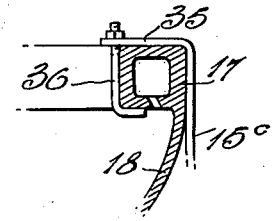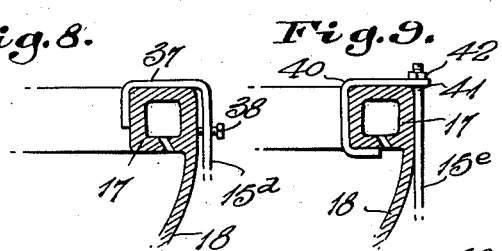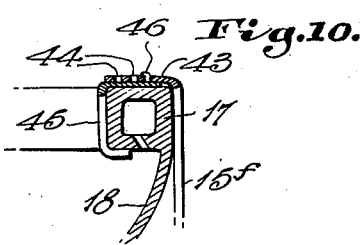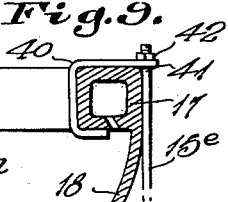

Patented July 5, 1938

2,122,832

UNITED STATES PATENT OFFICE 2,122,832

CLOSET BOWL STEP ATTACHMENT

George B. Bentz, New York, N. Y.

Application November 9, 1937, Serial No. 173,686

12 Claims. (Cl. 4—254)

The invention aims to provide a simple, inexpensive and highly desirable step attachment which may be easily connected with a closet bowl to enable children to more readily use the same, and with this object in view, the invention resides in the novel subject matter hereinafter described and claimed, description being accomplished by reference to the accompanying drawings.

Figs. 1, 2 and 3 are perspective views showing different forms of the attachment, the attachment of Figs. 1 and 2 being shown upon a closet bowl and that of Fig. 3 detached.

Fig. 4 is a diagrammatic top plan view illustrating the manner in which the attachment will clear the bowl rim when positioned at one side of the bowl and will solidly interlock therewith when moved to the front of the bowl.

Figs. 5 to 11 inclusive are detail views showing different ways of connecting the attachment with the bowl rim.

Fig. 12 is a perspective view of the spreader bar shown in Fig. 1.

Fig. 13 is a perspective view showing an extensible and retractable spreader which may be used instead of a one-piece spreader if desired.

Fig. 14 is a view similar to Figs. 5 to 11, but showing still another way of connecting the attachment with the bowl rim.

Fig. 15 is a perspective view showing a form of the invention differing from those above described.

Preferred features of construction have been shown in the drawings above briefly described, and will be rather specifically described, with the understanding however, that within the scope of the invention as claimed, variations may be made.

In the forms of construction shown in Figs. 1, 2 and 3, a metal rod is bent centrally between its ends to provide a U 12, the arms of said U being shown at 13 and the arm-connecting portion at 14. At the ends of the arms 13, the rod is further bent to provide hanger arms 15, and said rod is still further bent at the upper ends of said hanger arms to provide attaching hooks 16 for engagement with the usual rim 17 of a closet bowl 18. Parallel horizontal rods 19 extend between the arms 13 of the U 12 and are welded or otherwise secured thereto to coact therewith in forming a step. A horizontal bar 20 extends between the hanger arms 15 and is welded or otherwise secured thereto, and a setscrew 21 is threaded through the central portion of this bar to abut the closet bowl front to hold said arms 15 in vertical position.

In the forms of construction shown in Figs. 2 and 3, the upper portions of the hooks 16 are provided with handles 22 welded or otherwise secured thereto, each handle being preferably formed from a single rod bent into V-shape. Each of these handles is provided with horizontal portions 23 to extend under the plane of the closet bowl seat, and with substantially vertical portions 24 projecting upwardly from said portions 23 for location at the edge of the seat to provide hand grips, these hand grips aiding a child materially in climbing onto the seat, sitting thereon and again descending to the floor.

Fig. 3 discloses an additional means to abut the front of the closet bowl to stabilize the attachment, said means consisting of a slide 25 adjustably secured by a bolt or the like 26 to a small horizontal plate 27 which is welded or otherwise secured to two of the rods 19.

Each of the hooks 16 includes a horizontal portion 28 to rest on the bowl rim 17, a vertical portion 29 to lie against the inner side of said rim, and a horizontal detent portion 30 to underlie said rim, said detent 30 being disposed at the lower end of the portion 29 and being extended laterally outward from the hook 16. The detent portions 30 of the two hooks 16 are so positioned that when the attachment is disposed at one side of the bowl 18 as seen at the lower portion of Fig. 4, they will clear the bowl rim 17, permitting the hooks 16 to be easily engaged initially with said rim. When the attachment however, is slid around to the more abruptly curved front portion of the bowl 18, the detents 30 underlie the rim 17 as shown at one end of Fig. 4, thus holding the attachment solidly engaged with the bowl, particularly when the set-screw 21 has been adjusted to properly abut the bowl, or when the slide 25 has been adjusted to bowl-abutting position, or when both of these adjustments have been made.

In order to hold the portion 28 of the hooks 16 in rigid spaced relation and to thereby aid in rigidly holding the entire attachment in place, I prefer to provide a rigid spreader connecting said portions 28. While such a spreader is shown only on Figs. 1 and 4, it will be understood that it could also be employed in connection with the structure shown in Figs. 2 and 3. This spreader may consist of a one-piece bar 28$^a$ having spring clip portions 28$^b$ to snap over the horizontal portions 28 of the hooks 16, or it may consist of two adjustably connected sections 28$^c$ having spring clip portions 28$^d$, the one construction being shown in Figs. 1 and 12, and the other in Fig. 13.

In Figs. 5 to 11 respectively, the characters 15$^a$, 15$^b$, 15$^c$, 15$^d$, 15$^e$, 15$^f$, and 15$^g$ denote hanger arms corresponding to the arms 15 above described, and these views show various ways in which these hanger arms may be connected with the bowl rim if desired.

In Fig. 5, an L-shaped bolt 31 passes through the upper end of the arm 15$^a$, to rest upon the bowl rim and extend downwardly at the inner side thereof.

In Fig. 6, a hook 32 is provided on the upper end of the arm 15$^b$ to hook over the bowl rim, and a separate detent 33 is secured upon the free end of said hook by means of the nut 34, to underlie the bowl rim.

In Fig. 7, the upper end of the arm 15$^c$ is bent rearwardly at 35 to lie upon the bowl rim, and an L-shaped bolt 36 passes through the arm end 35 to lie against the inner side of and to underlie the bowl rim.

In Fig. 8, the upper end of the arm 15$^d$ is bent to provide a hook 37 secured upon the bowl rim by a set-screw 38.

In Fig. 9, a U-shaped member 40 is provided to embrace the bowl rim, one end of said member 40 having an eye 41 through which the upper end of the arm 15$^e$ passes, this arm being provided with a nut 42 overlying said eye 41.

In Fig. 10, the upper end 43 of the arm 15$^f$ is flattened, bent rearwardly and provided with a plurality of openings 44. A U-shaped member 45 embraces the bowl rim and underlies the portion 43, and said member 45 is provided with an integral hook 46 which may be hooked into any of the openings 44.

In Fig. 11, a J-shaped bolt 47 is engaged with an eye 48 on the upper end of the arm 15$^g$ to engage the bowl rim.

In Fig. 14, the upper end of the hanger rod 15$^h$ is provided with a hook 47 to hook over the bowl rim, the bill of this hook being formed with vertically spaced openings 48 through either of which a set-screw 49 may be threaded to pass under the bowl rim.

In Fig. 15, two hanger rods 15$^i$ are shown having their upper ends bent rearwardly at 28$^i$ to lie upon the bowl rim, and then bent downwardly and forwardly to provide hooks 16$^i$ to engage said rim, the portions 28$^i$ being preferably provided with hand-grips 22$^i$. The lower ends of the rods 15$^i$ are bent horizontally forward to provide parallel arms 50 which are received in tubes 51 secured to a plurality of parallel rods 12$^i$ and co-acting therewith in forming a step. A spreader 28$^e$ of the type shown in Fig. 13, is used between the two rod portions 28$^i$.

With the step detached from the rods 15$^i$ and the spreader 28$^e$ also detached therefrom, these rods may be readily hooked over the bowl rim. The tubes 51 may then be easily slid onto the arms 50 and the spreader 28$^e$ may be easily applied, said spreader being extended to laterally separate the hooks 16$^i$ and hold them solidly engaged with the bowl rim.

It will be seen from the foregoing that novel and advantageous provision has been made for carrying out the object of the invention, and attention is again invited to the possibility of making variations within the scope of the invention as claimed.

I claim:—

1. A step attachment for a closet bowl, comprising a one-piece rod bent centrally between its ends to form a U, said U being disposed in a horizontal plane, the end portions of said rod being bent vertically upward from the ends of said U to provide hanger arms of a length to extend to the rim of the closet bowl, means at the upper ends of said hanger arms for connecting them with the closet bowl rim and horizontal means connected with said U and cooperating therewith in forming a step.

2. A step attachment for a closet bowl, comprising a one-piece rod bent centrally between its ends to form a U, said U being disposed in a horizontal plane, the end portions of said rod being bent vertically upward from the ends of said U to provide hanger arms of a length to extend to the rim of the closet bowl, means at the upper ends of said hanger arms for connecting them with the closet bowl rim, closely spaced and horizontal rods secured to said U and cooperating therewith in forming a step.

3. A step attachment for a closet bowl, comprising a one-piece rod bent centrally between its ends to form a U, said U being disposed in a horizontal plane, the end portions of said rod being bent vertically upward from the ends of said U to provide hanger arms of a length to extend to the rim of the closet bowl, said end portions of said rod being further bent at the upper ends of said hanger arms to provide hooks to engage the closet bowl rim, and horizontal means connected with said U and cooperating therewith in forming a step.

4. A step attachment for a closet bowl, comprising a one-piece rod bent centrally between its ends to form a U, said U being disposed in a horizontal plane, the end portions of said rod being bent vertically upward from the ends of said U to provide hanger arms of a length to extend to the rim of the closet bowl, said end portions of said rod being further bent at the upper ends of said hanger arms to provide hooks to engage the closet bowl rim, and closely spaced horizontal rods secured to said U and cooperating therewith in forming a step.

5. A step attachment for a closet bowl, comprising a one-piece rod bent centrally between its ends to form a U, said U being disposed in a horizontal plane, the end portions of said rod being bent vertically upward from the ends of said U to provide hanger arms of a length to extend to the rim of the closet bowl, means at the upper ends of said hanger arms for connecting them with the rim of a closet bowl, a horizontal bar extending between said hanger arms and rigidly secured thereto, means carried by and projecting rearwardly from said bar to abut the exterior of the closet bowl and hold said hanger arms in vertical position, and horizontal means connected with said U and cooperating therewith in forming a step.

6. A step attachment for a closet bowl, comprising a rod bent centrally between its ends to form a U, said U being disposed in a horizontal plane, the end portions of said rod being bent vertically upward from the ends of said U to provide hanger arms, means at the upper ends of said hanger arms for connecting them with the rim of a closet bowl, a horizontal bar extending between said hanger arms and rigidly secured thereto, a set-screw threaded through said bar to abut the exterior of the closet bowl and hold said hanger arms in vertical position, and horizontal means connected with said U and cooperating therewith in forming a step.

7. A step attachment for a closet bowl, said attachment being provided with means to extend under the closet seat and engage the bowl rim, and handles secured to said hooks, said handles having horizontal portions to extend under the seat, and vertical hand grip portions extending upwardly from the outer ends of said horizontal portions for disposition at the seat edge.

8. A step attachment for a closet bowl provided with two laterally spaced attaching hooks to engage the bowl rim, said hooks each having a horizontal portion to lie upon said rim, a vertical portion to lie against the inner side of said rim, and a horizontal detent portion to underlie said rim, the detent portions of the two hooks being laterally positioned with respect to said hooks to clear the rim when the attachment is initially positioned at one side of the bowl and to underlie said rim when said attachment is slid around to the more abruptly curved front portion of said bowl.

9. A step attachment for a closet bowl, comprising a rod bent centrally between its ends to form a U, said U being disposed in a horizontal plane, the end portions of said rod being bent vertically upward from the ends of said U to provide hanger arms of a length to extend to the rim of the closet bowl, means at the upper ends of said hanger arms for connecting them with the rim of a closet bowl, closely spaced horizontal rods secured to said U and cooperating therewith in forming a step, a small plate extending between two of said rods and secured thereto, and a slide adjustably secured to said plate and projecting rearwardly from said step to abut the exterior of the closet bowl.

10. In a step attachment for a toilet bowl, said attachment having supporting hooks to engage the bowl rim, a spreader extending between the upper portions of said hooks and having both of its end portions bent into arched form to provide spring clips engaging said hook portions to hold the latter in rigidly spaced relation.

11. A step attachment for a closet bowl comprising two hanger rods having their upper end portions bent rearwardly to lie upon the bowl rim and further bent to provide hooks to engage said rim, the lower end portions of said hanger rods being bent horizontally forward, said upper and lower end portions being held in rigid relation with each other by the intervening intermediate portions of the rods, and step-forming means extending between said horizontally bent lower end portions of said rods.

12. A structure as specified in claim 11; said step-forming means having tubes at its ends slidably receiving said horizontally bent lower end portions of said rods.

GEORGE B. BENTZ.